(12) United States Patent
Fu et al.

(10) Patent No.: US 12,072,573 B2
(45) Date of Patent: Aug. 27, 2024

(54) BACKLIGHT ASSEMBLY, DISPLAY PANEL AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Changjia Fu, Beijing (CN); Dan Li, Beijing (CN); Haijun Shi, Beijing (CN); Bochang Wang, Beijing (CN); Fei Dong, Beijing (CN); Enliang Zhang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/005,098

(22) PCT Filed: Jun. 29, 2021

(86) PCT No.: PCT/CN2021/103071
§ 371 (c)(1),
(2) Date: Jan. 11, 2023

(87) PCT Pub. No.: WO2023/272482
PCT Pub. Date: Jan. 5, 2023

(65) Prior Publication Data
US 2023/0266617 A1 Aug. 24, 2023

(51) Int. Cl.
*G02F 1/13357* (2006.01)
*F21V 8/00* (2006.01)

(52) U.S. Cl.
CPC ..... *G02F 1/133603* (2013.01); *G02B 6/0073* (2013.01); *G02F 1/133608* (2013.01)

(58) Field of Classification Search
CPC ................................................ G02F 1/133608
See application file for complete search history.

(56) References Cited

U.S. PATENT DOCUMENTS 8,632,240 B2   1/2014   Tang et al.
9,441,828 B2   9/2016   Wu
(Continued)

FOREIGN PATENT DOCUMENTS

CN   101630089 A   1/2010
CN   202092019 U   12/2011
(Continued)

OTHER PUBLICATIONS

Lei Wen et al, Processing and molding of plastics, Material forming and processing experiment tutorial, pp. 33-35—Eng.
(Continued)

*Primary Examiner* — Sean P Gramling
(74) *Attorney, Agent, or Firm* — Leason Ellis LLP

(57) ABSTRACT

A backlight assembly, a display panel and a display device are provided. the backlight assembly includes: a work region, a light-emitting element, a light guide plate and a light guide structure. The work region includes a center region and an edge region surrounding the center region; the light-emitting element is at least in the center region; the light guide plate is in the work region, and configured to conduct light emitted by the light-emitting element and allow the light to exit from the work region; and the light guide structure is at a side of the light guide plate close to the light-emitting element, and arranged along at least part of an edge of the light guide plate; the light guide structure is configured to allow a part of the light emitted by the light-emitting element to enter the edge region.

19 Claims, 11 Drawing Sheets

(56) References Cited

U.S. PATENT DOCUMENTS

| | | | |
|---|---|---|---|
| 10,852,586 | B2 | 12/2020 | Li et al. |
| 2006/0007369 | A1 | 1/2006 | Jin et al. |
| 2019/0187518 | A1 | 6/2019 | Her et al. |
| 2020/0310198 | A1* | 10/2020 | Li ................... G02F 1/133606 |

FOREIGN PATENT DOCUMENTS

| | | | |
|---|---|---|---|
| CN | 103971600 | A | 8/2014 |
| CN | 105066013 | A | 11/2015 |
| CN | 207764521 | U | 8/2018 |
| CN | 108873482 | A | 11/2018 |
| CN | 109407396 | A | 3/2019 |
| CN | 109407400 | A | 3/2019 |
| CN | 109471293 | A | 3/2019 |
| CN | 109521600 | A | 3/2019 |
| CN | 110161751 | A | 8/2019 |
| CN | 209690674 | U | 11/2019 |
| CN | 209946590 | U | 1/2020 |
| CN | 210865431 | U | 6/2020 |
| CN | 211979368 | U | 11/2020 |
| CN | 112068353 | A | 12/2020 |
| CN | 213092065 | U | 4/2021 |
| CN | 213149433 | A | 5/2021 |

OTHER PUBLICATIONS

Chinese Office Action dated Jun. 18, 2024 cited in corresponding Chinese Application No. 202180001743.9.

* cited by examiner

A-A'

B-B'

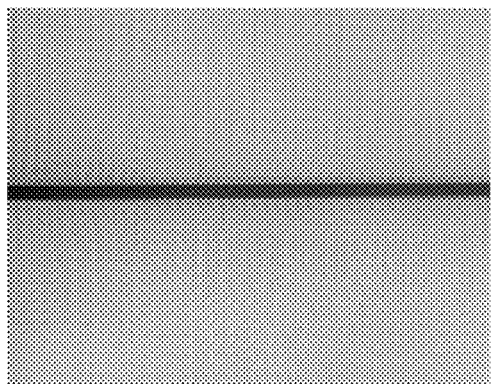
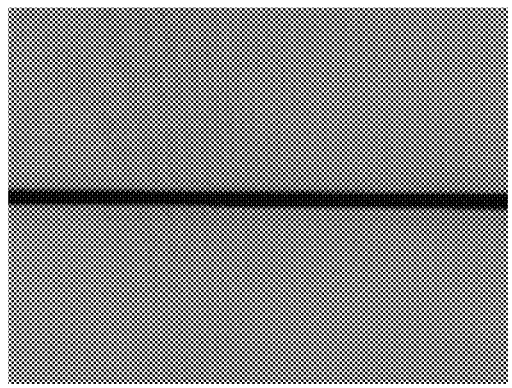
FIG. 3C　　　　　　　　　　FIG. 3D
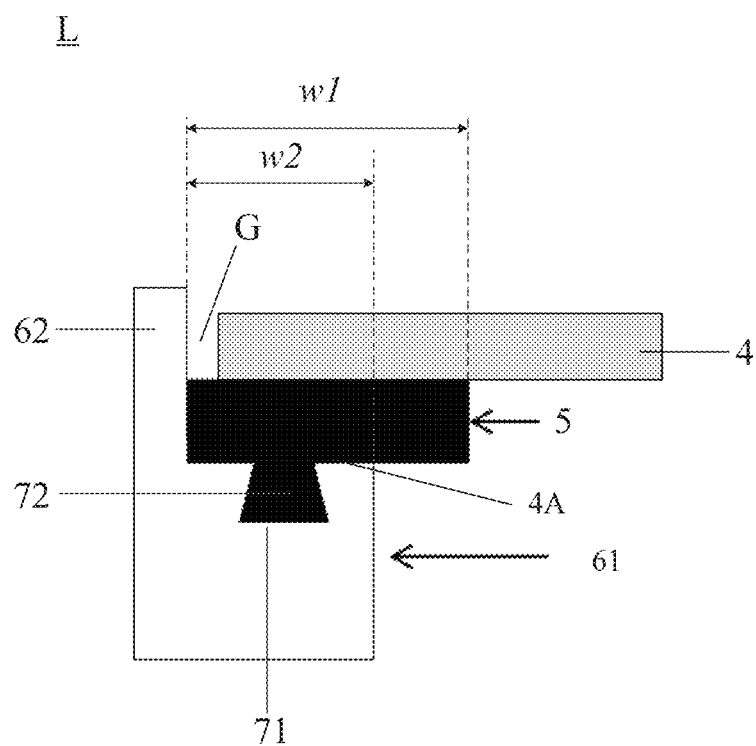
FIG. 4A

BACKLIGHT ASSEMBLY, DISPLAY PANEL AND DISPLAY DEVICE

CROSS-REFERENCE TO RELATED PATENT APPLICATIONS

This application is a U.S. National Stage Application under 35 U.S.C. § 371 of International Patent Application No. PCT/CN2021/103071 filed Jun. 29, 2021, which is incorporated by reference in its entirety. The International Application was published on Jan. 5, 2023 and received publication no. WO/2023/272482 A1.

TECHNICAL FIELD

The embodiment of the present disclosure relates to a backlight assembly, a display panel and a display device.

BACKGROUND

A liquid crystal display panel usually has a backlight source to provide light required tor display, the backlight source, such as a straight down backlight source or a side entry backlight source, usually, less light enters from the backlight source to the edge of the display region of the display panel, so that the brightness of the edge of the display region of the display panel is low, and the display screen is darker. At present, a large-size liquid crystal display panel may be formed by splicing multiple small-size sub-display panels, to provide the backlight source for each of the sub-display panels, edges of display regions of two adjacent sub-display panels are respectively located on two sides of a seam between the two adjacent sub-display panels, thus the brightness of the two sides of the seam is low.

SUMMARY

At least an embodiment of the present disclosure provides a backlight assembly, the backlight assembly comprises: a work region, a light-emitting element, a light guide plate and a light guide structure. The work region comprises a center region and an edge region surrounding the center region; the light-emitting element is at least in the center region; the light guide plate is in the work region, and configured to conduct light emitted by the light-emitting element and allow the light to exit from the work region; and the light guide structure is at a side of the light guide plate close to the light-emitting element, and arranged along at least part of an edge of the light guide plate; the light guide structure is configured to allow a part of the light emitted by the light-emitting element to enter the edge region.

For example, in the backlight assembly provided by at least an embodiment of the present disclosure, the light guide plate has a bottom surface facing the light-emitting element, and at least part of an orthographic projection of the light guide structure on a surface where the bottom surface of the light guide plate is located is within the bottom surface of the light guide plate.

For example, in the backlight assembly provided by at least an embodiment of the present disclosure, the light guide plate has a bottom surface facing the light-emitting element, and the light guide structure is in direct contact with the bottom surface of the light guide plate and protrudes from the bottom surface of the light guide plate.

For example, in the backlight assembly provided by at least an embodiment of the present disclosure, the light guide structure is light-transmitted; and the backlight assembly comprises a plurality of the light guide structures, the plurality of light guide structures are along the at least part of the edge of the light guide plate and spaced apart from each other, the plurality of light guide structures are configured that the light emitted by the light-emitting element passes through the plurality of light guide structures at positions of the plurality of light guide structures to reach the edge region and passes through the light guide plate at intervals between adjacent light guide structures of the plurality of light guide structures to reach the edge region.

For example, in the backlight assembly provided by at least an embodiment of the present disclosure, the light guide structure is light-transmitted; and the light guide structure is a continuous strip extending along the edge of the light guide plate, and the light guide structure is configured that the light emitted by the light-emitting element passes through the light guide structure and the light guide plate to reach the edge region.

For example, in the backlight assembly provided by at least an embodiment of the present disclosure, the light guide structure is opaque to light; and the backlight assembly comprises a plurality of the light guide structures, the plurality of light guide structures are spaced apart from each other along the at least part of the edge of the light guide plate, and the plurality of light guide structures are configured that the light emitted by the light-emitting element passes through the light guide plate at an interval between adjacent light guide structures of the plurality of light guide structures to reach the edge region.

For example, in the backlight assembly provided by at least an embodiment of the present disclosure, an extension direction of the edge of the light guide plate is a first direction; and in the first direction, a length of the interval between the adjacent light guide structures is greater than a length of each of the plurality of light guide structures.

For example, in the backlight assembly provided by at least an embodiment of the present disclosure, a ratio of the length of the interval to the length of each of the plurality of light guide structures is greater than or equal to 10.

For example, in the backlight assembly provided by at least an embodiment of the present disclosure, the length of the interval ranges from 30 mm to 50 mm; and the length of each of the light guide structures ranges from 1 mm to 2 mm.

For example, in the backlight assembly provided by at least an embodiment of the present disclosure, a direction perpendicular to the first direction and in the bottom surface of the light guide plate is a second direction, and a width of the light guide structure in the second direction ranges from 3 mm to 5 mm.

For example, in the backlight assembly provided by at least an embodiment of the present disclosure, the light guide structure comprises a light guide microstructure, the light guide microstructure is on a surface of the light guide structure facing the light guide plate.

For example, the backlight assembly provided by at least an embodiment of the present disclosure further comprises a support structure, the support structure comprises a first support part; the first support part is located at a side of the light guide plate close to the light-emitting element and comprises a first support surface facing the light guide plate in a direction perpendicular to the bottom surface of the light guide plate, and the first support part is configured to support the light guide plate, and the light guide plate has the bottom surface facing the light-emitting element, the light guide structure is between the first support surface and the bottom surface of the light guide plate, and is fixedly connected with the first support surface.

For example, in the backlight assembly provided by at least an embodiment of the present disclosure, the light guide structure comprises a first part and a second part. An orthographic projection of the first part on a plane where the first support surface is located is not overlapped with the first support surface; and the second part is fixedly connected with the first support surface and an orthographic projection of the second part on the plane where the first support surface is located is overlapped with the first support surface.

For example, in the backlight assembly provided by at least an embodiment of the present disclosure, the second part of the light guide structure is connected with the first support surface by an insertion method; the first support surface comprises a first groove, a surface of the second part of the light guide structure facing the first support surface comprises a first protrusion, the first protrusion is in the first groove, and a shape of the first protrusion is complementary to a shape of the first groove, or, the first support surface comprises a second protrusion, a surface of the second part of the light guide structure facing the first support surface comprises a second groove, the second protrusion is in the second groove, and a shape of the second protrusion is complementary to a shape of the second groove.

For example, in the backlight assembly provided by at least an embodiment of the present disclosure, a direction from the light-emitting element to the light guide plate is a third direction; and an area of a cross section of the protrusion perpendicular to the third direction gradually decreases along the third direction, or the cross section of the protrusion perpendicular to the third direction comprises a bent part.

For example, in the backlight assembly provided by at least an embodiment of the present disclosure, the support structure is opaque to light, in a case where the light guide structure is opaque to light, the light guide structure and the support structure are made of a same material and constitute an integral structure.

For example, the backlight assembly provided by at least an embodiment of the present disclosure further comprises a frame region, the frame region at least partially surrounding the work region, the support structure further comprises a second support part, the second support part is connected with the first support part and in the frame region; a side surface of the second support part facing the light guide plate is intersected with the first support surface, and the side surface of the second support part is in contact with or spaced apart from at least one selected from a group consisting of the edge of the light guide plate and the light guide structure.

For example, the backlight assembly provided by at least an embodiment of the present disclosure further comprises a bottom plate, the light-emitting element is on the bottom plate, and the first support part is connected with the bottom plate.

At least an embodiment of the present disclosure provides a display panel, the display panel comprises a display substrate and any one of the backlight assemblies provided embodiments of the present disclosure, the display substrate is located at a side of the light guide plate away from the light-emitting element.

For example, in the display panel provided by at least an embodiment of the present disclosure, the display panel comprises a display surface, the display surface comprises a display region and a non-display region at least partially surrounding the display region, the display region is located in an orthographic projection of the work region of the backlight assembly on the display surface; the backlight assembly is configured to allow the light emitted by the light-emitting element to enter the display region, and allow the light entering the edge region of the backlight assembly to enter an edge region of the display region; and an orthographic projection of the light guide structure on the display surface is at least partially in the edge region of the display region.

For example, in the display panel provided by at least an embodiment of the present disclosure, in the case that the display panel comprises a support structure and the support structure comprises a first support part and a second support part, the first support part is configured to support the light guide plate, the second support part is configured to support the display substrate, and an orthographic projection of the second support part on the display surface of the display substrate is in the non-display region.

For example, the display panel provided by at least an embodiment of the present disclosure comprises a plurality of display substrates, he plurality of display substrates are spliced with each other, edges of adjacent display substrates of the plurality of display substrates are opposite to each other, a seam is between the adjacent display substrates; each of the plurality of display substrates is provided with the backlight assembly, and the light guide structure is located on at least one side of the seam.

At least an embodiment of the present disclosure provides a display device, and the display device comprises the display panel according to any one of claims 19 to 22.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not (imitative of the present disclosure.

FIG. 3C is a diagram showing that brightness of an edge of a display region corresponding to an edge region near a seam of a splicing display panel is relatively dark;

FIG. 3D is a diagram of a brightness improvement effect of the edge of the display region corresponding to the edge region near the seam of the splicing display panel using the backlight assembly provided by an embodiment of the present disclosure;

FIG. 4A is an enlarged schematic diagram of the part L in FIG. 2A;

DETAILED DESCRIPTION

Figure 1:
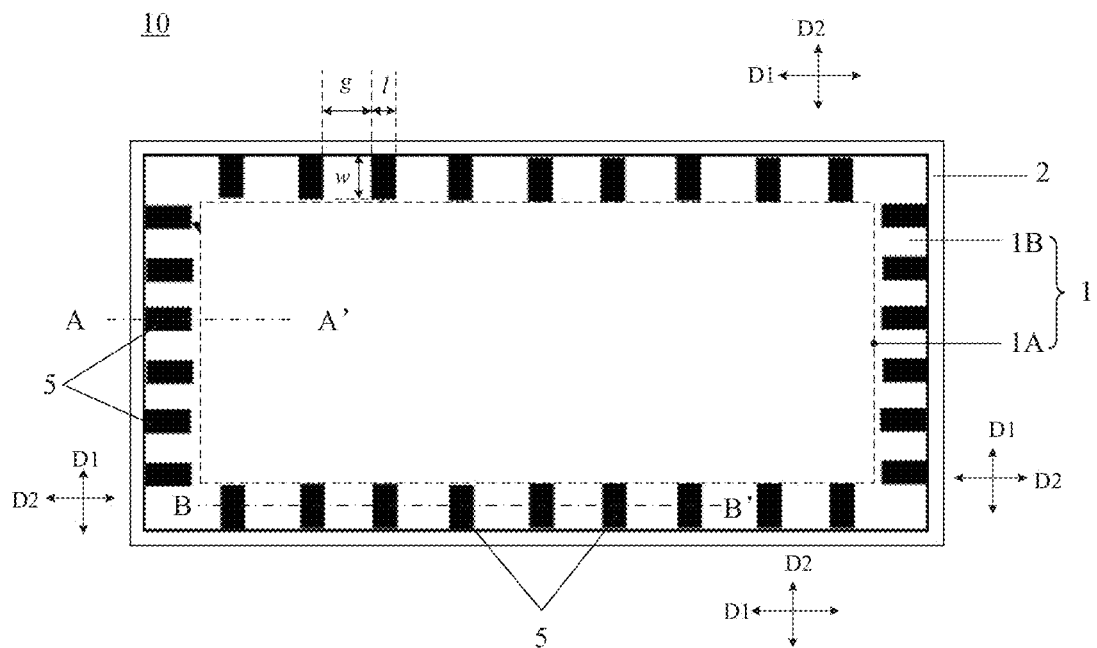
FIG. 1 is a planar schematic diagram of a backlight assembly provided by an embodiment of the present disclosure.

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or a mechanical connection, but may comprise an electrical connection which is direct or indirect. The terms "on," "under," "left," "right" and the like are only used to indicate relative position relationship, and in a case that the position of an object is described as being changed, the relative position relationship may be changed accordingly.

Dimensions of the drawings used in the present disclosure are not strictly to scale, a number of light guide structures in the display region is not limited to the number shown in the figures, and the specific size and the quantity of each structure can be determined according to the actual requirements. The drawings described in the present disclosure are only structural schematic diagrams.

At least one embodiment of the present disclosure provides a backlight assembly, the backlight assembly includes: a work region, a light-emitting element, a light guide plate and a light guide structure. The work region includes a center region and an edge region surrounding the center region; the light-emitting element is at least located in the center region; the light guide plate is located in the work region, and the light guide plate is configured to conduct light emitted by the light-emitting element and allow the light to exit from the work region; the light guide structure is located at a side of the light guide plate close to the light-emitting element, and is arranged along at least part of an edge of the light guide plate, the light guide structure is configured to allow a part of the light emitted by the light-emitting element to enter the edge region. The backlight assembly provided by the embodiments of the present disclosure can improve degree of uniformity of light in the edge region of the work region, and improve brightness of the edge region of the work region, to correspondingly improve the luminous state of the edge of the display region of the display panel adopting the backlight assembly. For example, the work region is a region light-emitting.

Figure 2A:
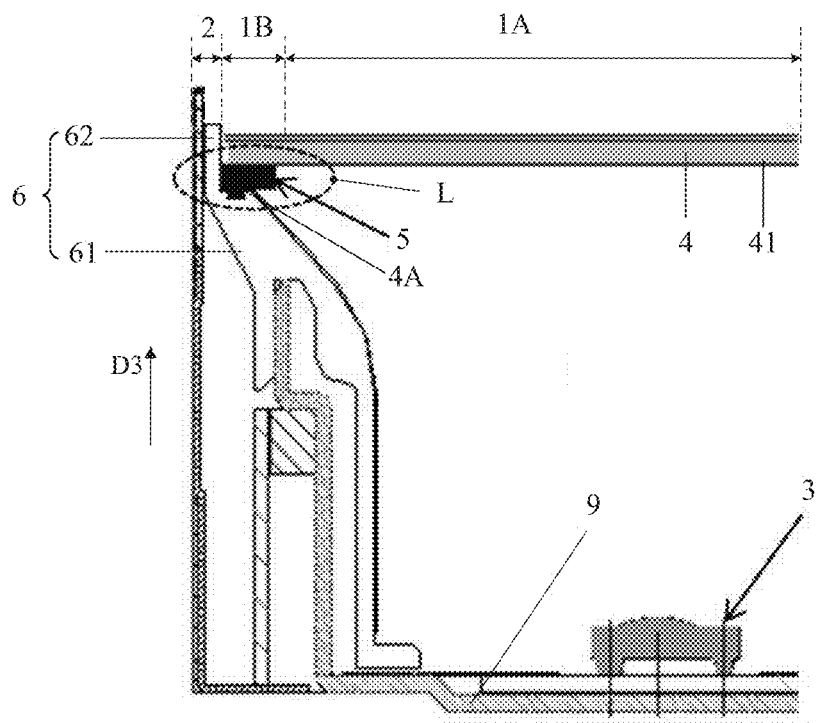
FIG. 2A is a cross-sectional schematic diagram taken along a line A-A' in FIG. 1.
Figure 2B:
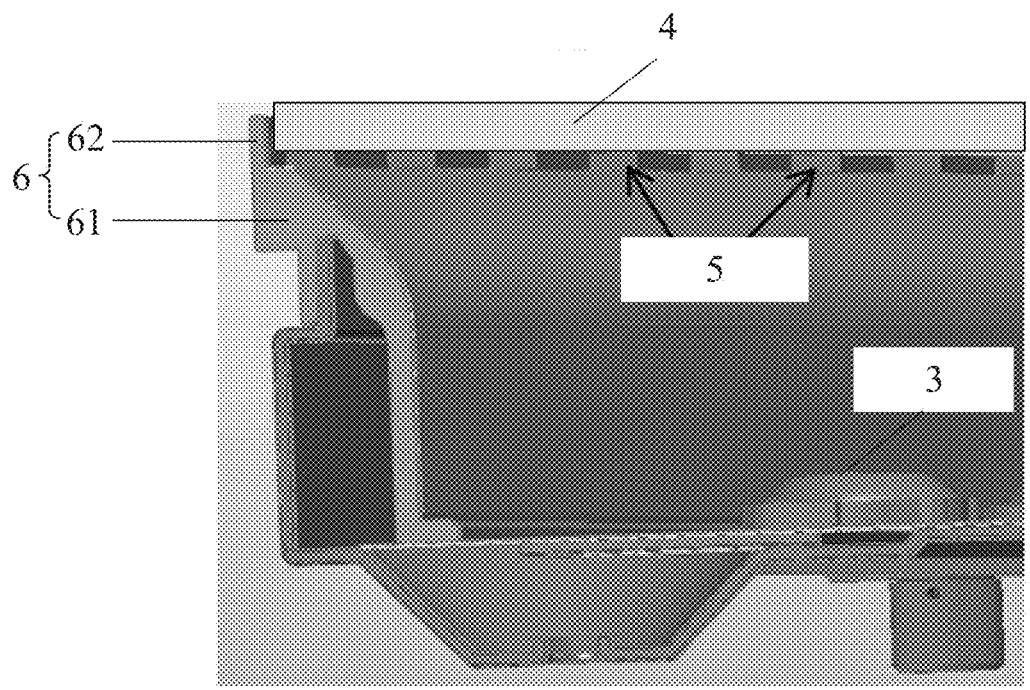
FIG. 2B is a cross-sectional schematic diagram taken along a line B-B' in FIG. 1.
Figure 2C:
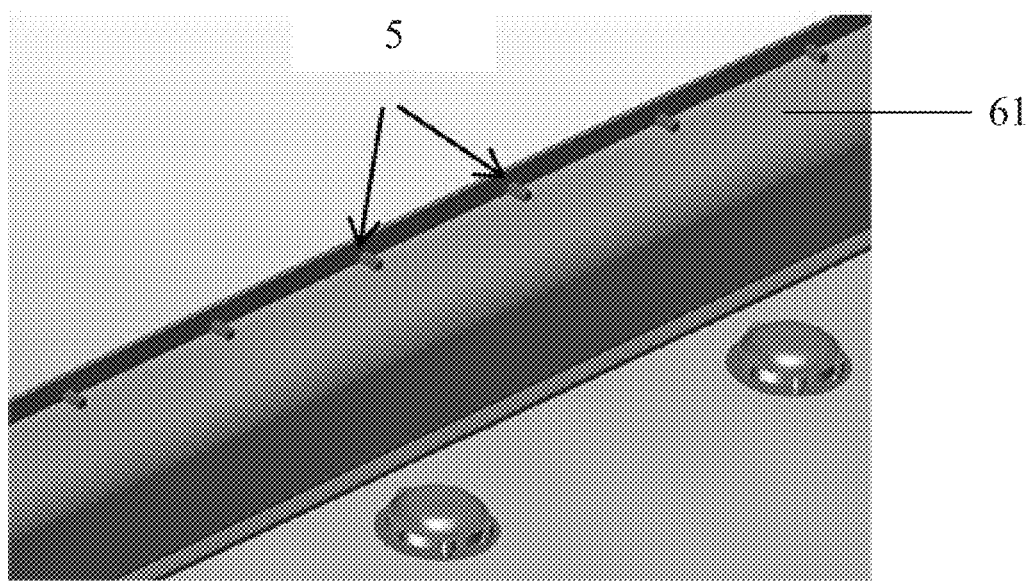
FIG. 2C is a schematic diagram of a part of the backlight assembly including light guide structures shown in FIG. 1.

Exemplarily, FIG. 1 is a planar schematic diagram of a backlight assembly provided by an embodiment of the present disclosure, FIG. 2A is a cross-sectional schematic diagram taken along the line A-A' in FIG. 1, FIG. 2B is a cross-sectional schematic diagram taken along the line B-B' in FIG. 1, and FIG. 2C is a schematic diagram of a part of the backlight assembly including light guide structures shown in FIG. 1. Combining FIG. 1 and FIGS. 2A to 2C, the backlight assembly 10 includes a work region 1, a light-emitting element 3, a light guide plate 4 and a plurality of light guide structures 5. The work region 1 includes a center region 1A and an edge region 1B surrounding the center region 1A. For example, the work region 1 is a region emitting light; the edge region 1B is a part of the work region 1 close to an edge of the work region 1, that is, an area near the edge of the work region 1. The light-emitting element 3 is at least located in the center region 1A; for example, the light-emitting element 3 is located in a center of the work region 1, such as at a geometric center of the work region 1. For example, the backlight assembly 10 includes a plurality of light-emitting elements 3, the plurality of light-emitting elements 3 are located in the center region 1A, for example, the plurality of light-emitting elements 3 are distributed in an array. For example, the light-emitting element 3 is an organic light-emitting diode or an inorganic light-emitting diode, of course, the present disclosure does not limit types and specific positions of the light-emitting elements 3. The light guide plate 4 is located in the work region 1, and is configured to conduct the light emitted by the light-emitting element 3 and allow the light to exit from the work region 1. For example, the light guide plate 4 is located in the entire work region 1 and the entire work region 1 is arranged with the light guide plate 4, that is, the region where the light guide plate 4 is located and the work region 1 are equal to each other and are the same, that is, an orthographic projection of the light guide plate 4 on a plane parallel to a light emitting surface of the light guide plate 4 coincides with an orthographic projection of the work region 1 on the plane parallel to the light-emitting surface of the light guide plate 4. For example, the light guide plate 4 is configured to homogenize or diffuse the light from the light-emitting element 3; the light guide plate can not only be an integral plate-like structure, for example, the light guide plate may further include a diffusion layer or may be a diffusion layer, for example, the diffusion layer includes scattering particles, to homogenize or diffuse the light from the light-emitting element 3. The light guide structure 5 are located at a side of the light guide plate 4 close to the light-emitting element 3, and are arranged along at least part of an edge of the light guide plate 4, and the light guide structures 5 are configured to allow a part of the light emitted by the light-emitting element 3 to enter the edge region 1B. Usually; brightness of the edge region of the work region of the backlight assembly is low, thus in the case that the backlight assembly is applied to a display panel, display brightness of the display region corresponding to the edge region is low, which causes uneven display brightness, and affects the display effect. The light guide structure 5 of the backlight assembly 10 provided by the embodiment of the present disclosure can elevate the light guide plate 4 in a height direction D3 shown in FIG. 2A, so that more light reach the edge region 1B, and a problem of low brightness in the edge region 1B is eliminated, so that the degree of uniformity of light in the edge region 1B of the work region 1 is improved, and the brightness of the edge region 1B of the work region 1 is improved, to correspondingly improve the luminous state of the edge of the display region of the display panel adopting the backlight assembly 10 provided by the embodiment of the present disclosure, and a display effect with uniform brightness is achieved.

Figure 3A:
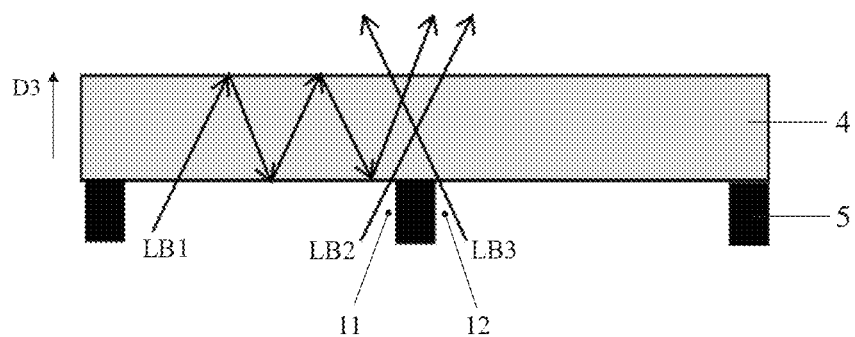
FIG. 3A is a first schematic diagram of adjusting light by a backlight assembly provided by an embodiment of the present disclosure.
Figure 3B:
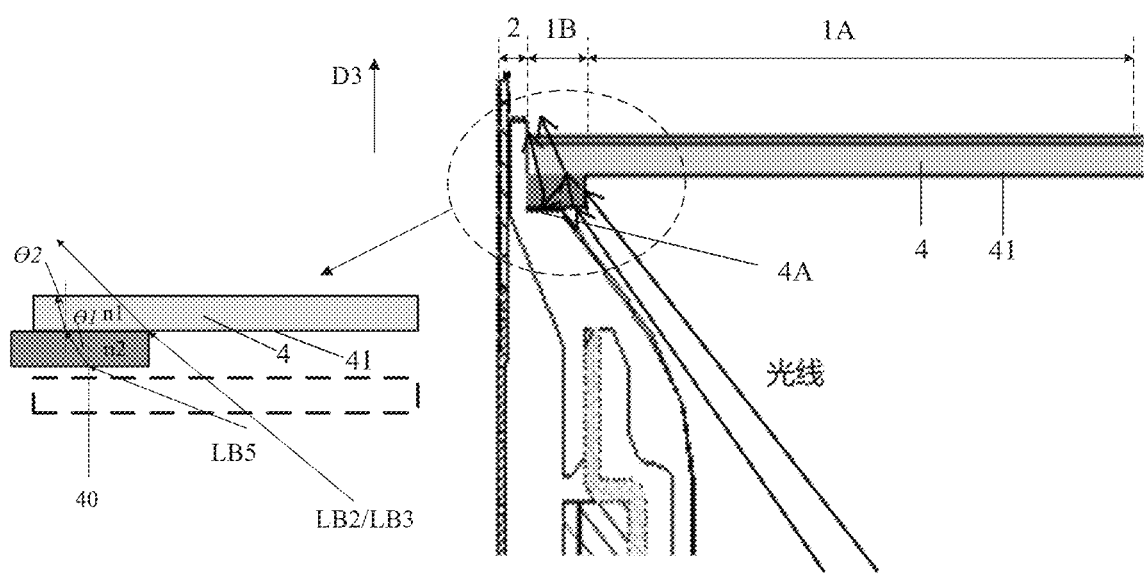
FIG. 3B is a second schematic diagram of adjusting light by a backlight assembly provided by an embodiment of the present disclosure.

FIG. 3A is a first schematic diagram of adjusting light by the backlight assembly provided by an embodiment of the present disclosure, and FIG. 3B is a second schematic diagram of adjusting light by the backlight assembly provided by an embodiment of the present disclosure. Referring to FIG. 3A and FIG. 3B, because the light guide structures 5 can elevate the light guide plate 4 in the height direction D3, more light, especially the light LB2/LB3 with a larger incident angle incident on the light guide structure 5 and the light guide plate 4, can pass through a space 11/12 near the light guide structure 5 and then pass through the light guide plate 4 to exit from the edge region 1B, so that an effect of improving the brightness of the edge region 1B is achieved. Compared with the case shown in FIG. 3B in which the light guide structure 5 does not exist, a hypothetical light guide plate 40 represented by a dotted rectangular frame has a lower height in the height direction D3, in this case, the light LB2/LB3 with a same large incident angle passes through the hypothetical light guide plate 40 and exits at a position at a side of the edge region 1B close to the center region 1A, for example, the light LB2/LB3 exits in the center region 1A, therefore, compared with the backlight assembly 10 provided by the embodiment of the present disclosure, in this case, less light exits from the edge region 1B. Therefore, the backlight assembly 10 provided by the embodiment of the present disclosure can allow more light to exit from the edge region 1B, thereby improving the above-mentioned problem of low brightness in the edge region 1B. At the same time, the light LB1 enters the light guide plate 4 from intervals among the plurality of light guide structures 5, the light enters the edge region 1B after being reflected multiple times in the light guide plate 4, to improve the above-mentioned problem of low brightness in the edge region 1B.

FIG. 3C is a diagram showing that brightness of an edge of a display region corresponding to an edge region near a seam of a splicing display panel is relatively dark, and FIG. 3D is a diagram of a brightness improvement effect of the edge of the display region corresponding to an edge region near a seam of a splicing display panel using the backlight assembly provided by an embodiment of the present disclosure. The splicing display panel is formed by splicing a plurality of sub-display panels, black lines in FIG. 3C and FIG. 3D are seams between two adjacent sub-display panels, positions of the black lines are non-display regions, positions immediately adjacent to the seams are edges of the display region corresponding to the edge region 1B of the backlight assembly 10, comparing the brightness of the edges of the display regions in FIG. 3C and FIG. 3D, it can be seen that, as shown in FIG. 3D, the brightness of the edge of the display region corresponding to the edge region near the seam of the splicing display panel using the backlight assembly provided by the embodiment of the present disclosure is relatively high, a phenomenon that the edge brightness of the display region on two sides of the seam is relatively dark can hardly be seen, which improves the display effect.

Figure 5A:
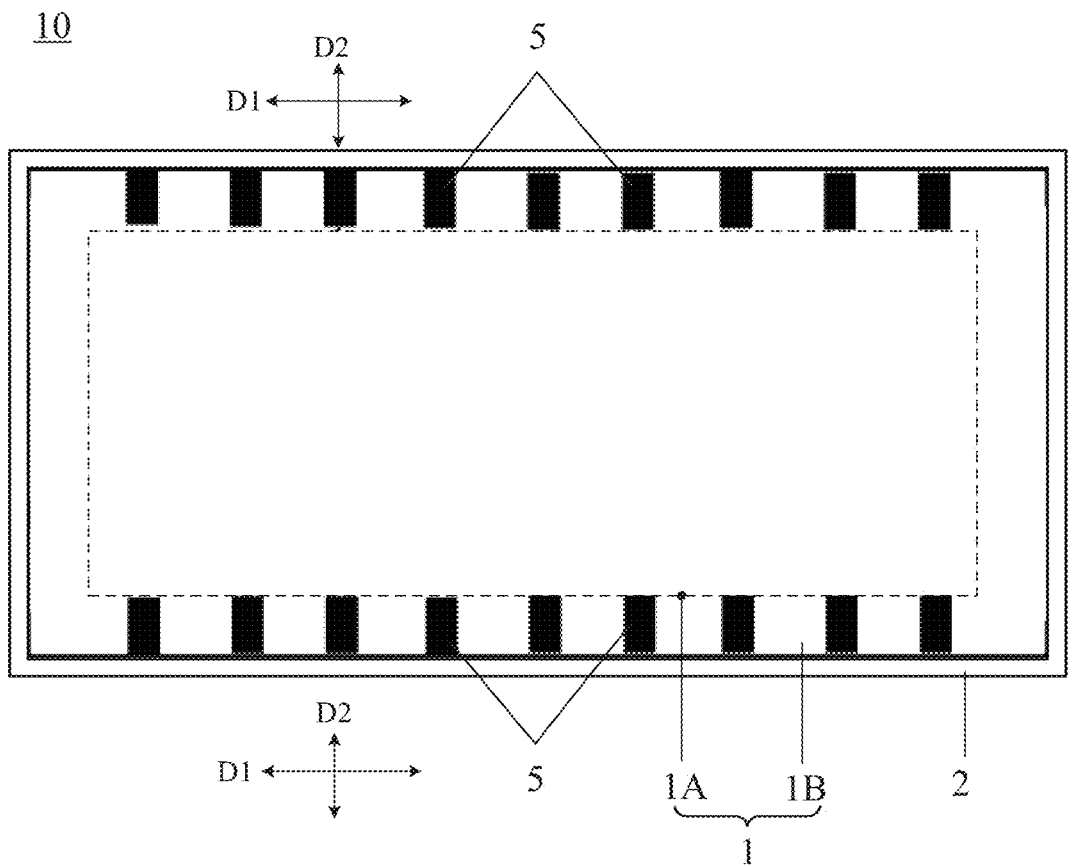
FIG. 5A is a planar schematic diagram of another backlight assembly provided by an embodiment of the present disclosure.

For example, both the planar shape of the whole backlight assembly 10 and the planar shape of the light guide plate 4 shown in FIG. 1 are rectangles, the plurality of light guide structures 5 are arranged along each of the four edges of the rectangle, to improve the problem of low brightness in the edge region 1B near each of the four edges. The light guide structures 5 are not limited to be arranged along each edge of the light guide plate 4. For example, FIG. 5A is a planar schematic diagram of another backlight assembly provided by an embodiment of the present disclosure, in the embodiment shown in FIG. 5A, the light guide structures 5 are arranged along a part of the edge of the light guide plate, for example, arranged along two opposite edges. Those skilled in the art can set according to the position required to improve the brightness.

Of course, the planar shape of the whole backlight assembly 10 and the planar shape of the light guide plate 4 are not limited to rectangles, may be other polygons, circles, or irregular shapes, and in each case, the light guide structures 5 are distributed along the edge of the light guide plate 4.

For example, as shown in FIG. 2A, the light guide plate 4 has a bottom surface 41 facing the light-emitting element 3, for each light guide structure 5, a part of an orthographic projection of the light guide structure 5 on the surface where the bottom surface 41 of the light guide plate 4 is located is located within the bottom surface 41 of the light guide plate 4, that is, the light guide structure 5 protrudes from the edge of the light guide plate 4 in a direction parallel to the bottom surface 41.

Figure 4B:
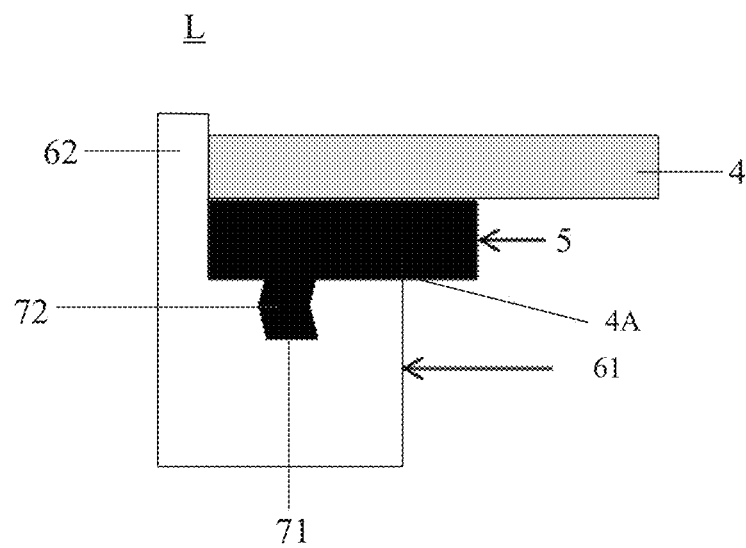
FIG. 4B is another enlarged schematic diagram of the part L in FIG. 2A.

FIG. 4B is an enlarged schematic diagram of the part L in FIG. 2A. For example, in some other embodiments, as shown in FIG. 4B, the orthographic projection of the entire light guide structure 5 on the surface where the bottom surface 41 of the light guide plate 4 is located is located in the bottom surface 41 of the light guide plate 4. Therefore, the light guide structure 5 cannot protrude from the edge of the light guide plate 4 in the direction parallel to the bottom surface 41, thus the backlight assembly 10 has a narrow frame, so that the display panel using the backlight assembly 10 has a narrower frame.

For example, as shown in FIG. 2A, the light guide structure 5 is in direct contact with the bottom surface 41 of the light guide plate 4 and protrudes from the bottom surface 41 of the light guide plate 4. For example, the height of the part of the light guide structure 5 protruding from the bottom surface 41 ranges from 1 mm to 2 mm, it has been verified by experiments that this height range can obtain an ideal dimming effect; if the height is too small, the ideal effect of dimming the light guide plate 4 on the third direction D3 cannot be achieved, so that the ideal dimming effect cannot be obtained; if the height is too large, modulation of light will be too large and the thickness of the backlight assembly in the third direction D3 will be unnecessarily increased, which is unfavorable for using the backlight assembly to manufacture thin and light devices such as thin and light display panels. Of course, the embodiment of the present disclosure does not limit the range of the height.

In some embodiments, as shown in FIG. 1, FIGS. 2A to 2C, for example, the light guide structure 5 is light-transmitted. In this case, for example, the backlight assembly 10 includes a plurality of light guide structures 5, the plurality of light guide structures 5 are spaced apart from each other along the edge of the light guide plate 4, the plurality of light guide structures 5 are configured that the light emitted by the light-emitting element 3 passes through the plurality of light guide structures 5 at positions of the plurality of light guide structures 5 to reach the edge region 1B or the light emitted by the light-emitting element 3 passes through the light guide structures and the light guide plate in sequence to reach the edge region 1B, or the light emitted by the light-emitting element 3 passes through the light guide plate 4 at intervals among adjacent light guide structures 5 to reach the edge region 1B. It should be noted that, at the positions of the light guide structures 5, whether it is required that the light passes through the light guide plate 4 after passing through the light guide structures 5 to reach the edge region 18 depends on whether the light guide structures 5 are overlapped with the light guide plate 4 at the positions. The plurality of light guide structures 5 are distributed at intervals along the edge of the light guide plate 4, which is beneficial to improve the light transmittance while improving the brightness of the light emitted in the edge region 1B.

For example, in the case that the backlight assembly 10 includes a plurality of light guide structures 5, and the plurality of light guide structures 5 are distributed along the edge of the light guide plate 4 and spaced apart from each other, distribution densities of the plurality of light guide structures 5 are the same, that is, distances among adjacent light guide structures 5 are equal, and the plurality of light guide structures 5 are evenly distributed, so as to be suitable for a requirement of uniformly adjusting the brightness of the light in the edge region 1B; or, the distribution densities of the plurality of light guide structures 5 are different, which is suitable for the case that an the brightness of the edge region 1B are uneven along the edge of the light guide plate 4; for example, in a position where the brightness of the edge region 1B is lower, the distribution density of the light guide structures 5 is higher, in a position where the brightness of the edge region 1B is higher, the distribution density of the light guide structures 5 is lower.

Figure 5B:
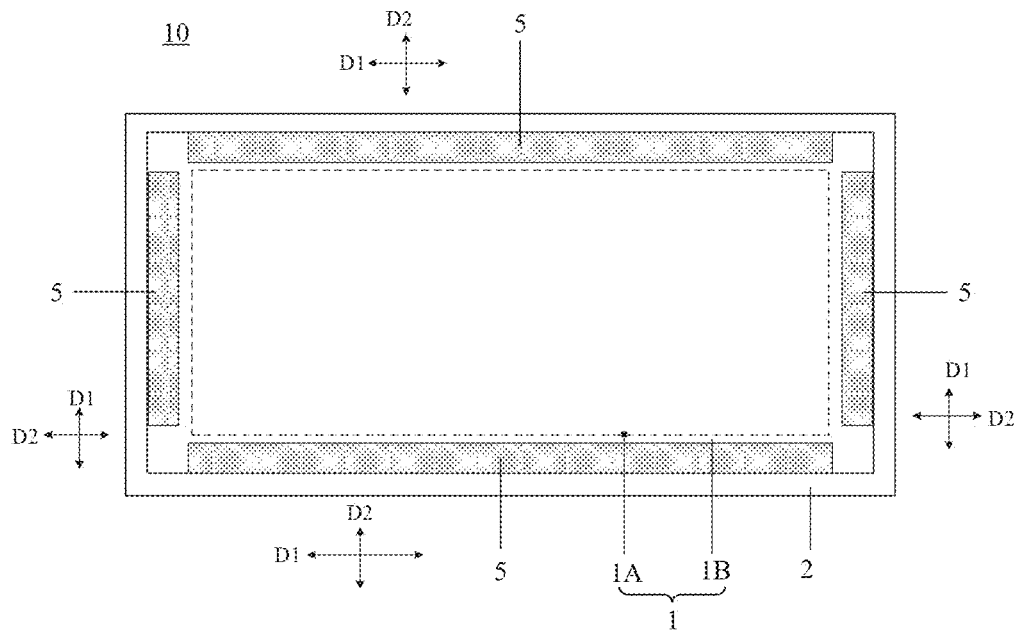
FIG. 5B is a planar schematic diagram of still another backlight assembly provided by an embodiment of the present disclosure.

FIG. 5B is a planar schematic diagram of still another backlight assembly provided by an embodiment of the present disclosure. As shown in FIG. 5B, for example, the light guide structures 5 are light-transmitted; each of the light guide structures 5 is a continuous strip extending along the edge of the light guide plate 4, the light guide structures 5 are configured that the light emitted by the light-emitting element 3 reaches the edge region 1B after passing through the light guide structures 5 and the light guide plate 4. The feature that each of the light guide structures 5 is a continuous strip extending along the edge of the light guide plate 4 is beneficial to better improve the brightness of the light emitted in the edge region 1B.

In the case that the light guide structures 5 are light-transmitted, the improvement of the brightness of the edge region 1B by the light guide structures 5 is achieved through refraction in addition to the above-mentioned elevating the light guide plate 4. Specifically, referring to FIG. 3B, each of the light guide structures 5 has a bottom surface facing the light-emitting element 3, an incident angle of light LB5 from the light-emitting element 3 entering the bottom surface of the light guide structures 5 is relatively large, if the light guide structure 5 does not exist, the light LB5 with a larger incident angle will not be able to reach the edge region 1B.

However, in the backlight assembly 10 provided by the present disclosure, the light LB5 is refracted for a first time on the bottom surface of the light guide structure 5, a first refraction angle θ1 is smaller than the incident angle, so that the light LB5 is deviated toward a direction close to the center region 1A and enters the edge region 1B. At a position where the light guide structure 5 is overlapped with the light guide plate 4, that is, the position where orthographic projections of the light guide structure 5 on the plane where the bottom surface 41 of the light guide plate 4 is located and the light guide plate 4 on the plane where the bottom surface 41 of the light guide plate 4 is located overlap with each other, the light LB5 passes through the light guide structure 5 and is incident on the light guide plate 4, and then the light LB5 is emitted from the backlight assembly 10; the light LB5 is refracted for a second time at an interface between the light guide structure 5 and the light guide plate 4, for example, a refractive index of the light guide plate 4 is N1, a refractive index of the light guide structure 5 is N2, for example, N1<N2, so that a second refraction angle θ2 is smaller than the first refraction angle θ1, that is, after the second refraction, the light LB5 further deviates toward the direction close to the center region 1A and enters the edge region 1B, so that the light LB5 with the larger incident angle can enter the edge region 1B, an amount of light entering the edge region 1B is increased, the effect of improving the brightness of the edge region 1B is better, and an utilization rate of the light is improved at the same time.

For example, material of the light-transmitted light guide structure 5 may include at least one of transparent materials such as polymethyl methacrylate (PMMA) and polycarbonate (PC). Of course, the embodiment of the present disclosure does not limit material of the opaque light guide structures 5.

For example, in some embodiments, as shown in FIG. 1 and FIGS. 2A to 2C, the light guide structure 5 can also be opaque; the backlight assembly 10 includes a plurality of light guide structures 5, the plurality of light guide structures 5 are distributed at intervals along the edge of the light guide plate 4, the light guide structures 5 are configured that the light emitted by the light-emitting elements 3 reaches the edge region 1B through the light guide plate 4 at the intervals among adjacent light guide structures 5. In this case, as shown in FIG. 3A, the light guide structure 5 elevates the light guide plate 4 in the height direction D3, so that more light LB2/LB3 with a larger incident angle incident on the light guide plate 4 passes through the space 11/12 near the light guide structure 5 and passes through the light guide plate 4 to exit from the edge region 1B, so that the effect of improving the brightness of the edge region 1B is achieved.

For example, the material of the opaque light guide structure 5 may include at least one of opaque materials such as aluminum extrusion or plastic. Of course, the embodiment of the present disclosure does not limit the material of the opaque light guide structure 5.

For example, as shown in FIG. 1, the extension direction of the edge of the light guide plate 4 is a first direction D1; it should be noted that, for each edge of the light guide plate 4, a first direction D1 is provided, the first directions D1 defined by different edges extending in different directions are different, for example, in FIG. 1, first directions D1 defined by four edges of a rectangular light guide plate 4 are different. For example, in the first direction D1, the length g of an interval between adjacent light guide structures 5 is greater than the length l of each of the light guide structures 5, experiments have shown that, compared with other designs, in this way, not only a better effect of adjusting the brightness of the edge region 1B can be achieved, but also, because the length l of each of the light guide structures 5 is relatively small, and the length g of the interval between adjacent light guide structures 5 is relatively large, a part of the light reaching the position of the interval between the adjacent light guide structures 5 is supplemented to the positions of the light guide structures 5, so that the brightness of the entire edge region 1B is uniform, and a phenomenon that the position of the light guide structure 5 is darker will not be caused by a partial arrangement of the light guide structures 5.

For example, in the first direction D1, a ratio of the length g of the interval between adjacent light guide structures 5 to the length l of each of the light guide structures 5 is greater than or equal to 10. Experiments have proved that, compared with other size relationships, in this way, a better effect of adjusting the brightness of the edge region 1B can be achieved.

For example, the length g of the interval between two adjacent light guide structures 5 ranges from 30 mm to 50 mm. Experiments have proved that, the range of the value of the length g can achieve an ideal improvement of the brightness of the edge region 1B, and at the same time, a manufacturing difficulty of the light guide structure 5 is not too great, which is the most ideal range. If the length g is too large, the ideal effect of improving the brightness of the edge region 1B cannot be achieved; if the length g is too small, the brightness of the edge region 1B will be excessively adjusted, and the manufacturing difficulty of the light guide structure 5 will be increased.

For example, the length l of each of the light guide structures 5 ranges from 1 mm to 2 mm. For example, a direction perpendicular to the first direction D1 and located in the bottom surface of the light guide plate 4 is the second direction D2, a width of each of the light guide structures 5 in the second direction D2 ranges from 3 mm to 5 mm. Experiments have proved that the value ranges of the length l and the width w1 of each of the light guide structures 5 can achieve an ideal improvement of the brightness of the edge region 1B, and the manufacturing difficulty of the light guide structures is not too great, which is the most ideal range. If the length l and width w1 are too large, the brightness of the edge region 1B will be excessively adjusted, and the light transmittance will be affected, so that the ideal effect of improving the brightness of the edge region 1B will not be achieved; if the length g and the width w1 are too small, a desired effect of improving the brightness of the edge region 1B is difficult to obtain, and the manufacturing difficulty of the light guide structures 5 is increased.

Figure 6:
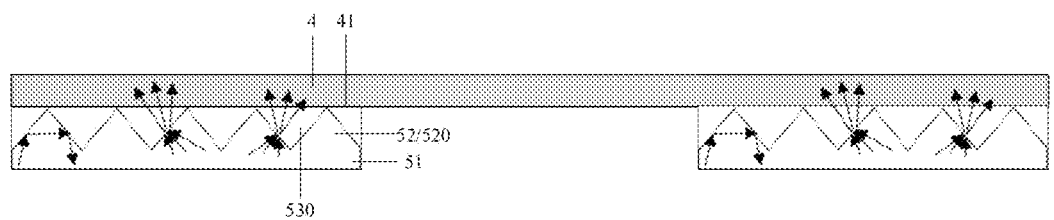
FIG. 6 is a schematic diagram of another light guide structure of a backlight assembly provided by an embodiment of the present disclosure.

FIG. 6 is a schematic diagram of another light guide structure of a backlight assembly provided by an embodiment of the present disclosure. As shown in FIG. 6, for example, each of the light guide structures 5 includes a light guide microstructure 52, and the light guide microstructure 52 is located on a surface of the light guide structure 5 facing the light guide plate 4, so as to diffuse the light incident into the corresponding light guide structure 5 using the light guide microstructure 52, a better diffusion effect can be obtained, so that more light enters the edge region 1B, and a better effect of improving the brightness of the edge region 1B is achieved. For example, each of the light guide structures 5 includes a substrate 51 and a light guide microstructure 52 on the substrate, the light guide microstructure 52 is located at a side of the substrate 51 facing the light guide plate 4. For example, the light guide microstructure 52 includes a plurality of first microstructure units 520 (a cross section in FIG. 6 is a triangle) periodically distributed on the substrate 51. For example, the light guide structure 5 further includes a plurality of second microstructure units 530 filled between the plurality of first microstructure units 520, thus the surfaces of the plurality of first microstructure units 520 are flat, so that the light guide microstructure 52 can be more firmly combined with the light guide plate 4; for example, a shape of each of the second microstructure units 530 is complementary to a shape of the corresponding first microstructure units 520. For example, the light guide microstructure 52 is a two-dimensional grating or a three-dimensional grating. For the specific design of the light guide microstructure 52, those skilled in the art may refer to conventional techniques in the art.

For example, as shown in FIG. 2A, the backlight assembly 10 further includes a support structure 6. The support structure 6 includes a first support part 61, the first support part 61 is located at a side of the light guide plate 4 close to the light-emitting element 3, includes a first support surface 4A facing the light guide plate 4 in the direction perpendicular to the bottom surface, and is configured to support the light guide plate 4. In this way, the light guide structure 5 and the first support part 61 together play a role of supporting the light guide plate 4.

For example, the first support surface 4A is in a strip shape, the strip extends in a direction perpendicular to both the first direction D1 and the three directions D3. For example, in other embodiments, the first support surface 4A may include a plurality of parts spaced apart from each other, each part corresponds to a light guide structure, that is, a plurality of parts of the first support surface 4A that are spaced apart from each other are also arranged along the first direction D1, similar to an arrangement of the plurality of light guide structures 5 spaced apart from each other, the plurality of parts are connected in one-to-one correspondence with a plurality of light guide structures 5 distributed at intervals from each other.

For example, the light guide structure 5 is located between the first support surface 4A and the bottom surface 41 of the light guide plate 4, and is fixedly connected with the first support surface 4A, so that the light guide structure 5 and the first support part 61 together stably support the light guide plate 4.

For example, as shown in FIGS. 2A and 4A, the light guide structure 5 includes a first part and a second part. An orthographic projection of the first part on a plane where the first support surface 4A is located is not overlapped with the first support surface 4A, the first part extends in the width direction beyond the first support surface; the second part is fixedly connected with the first support surface 4A and an orthographic projection of the second part on the plane where the first support surface 4A is located overlaps with the first support surface 4A. In the case that the light guide structure 5 is light-transmitted and the first support part 61 is opaque to light, for example, the light guide structure 5 is transparent, the light from the light-emitting element 3 can enter the edge region of the display region through the first part of the light guide structure 5.

Figure 4C:
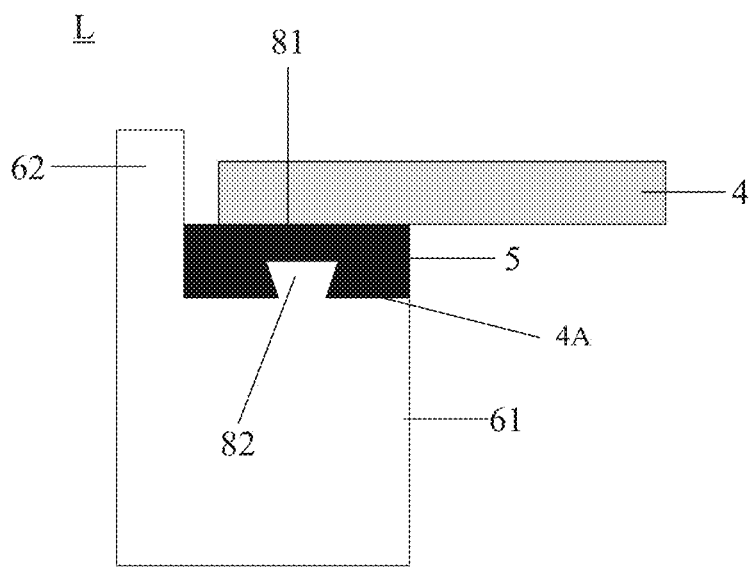
FIG. 4C is still another enlarged schematic diagram of the part L in FIG. 2A.

FIG. 4A is an enlarged schematic diagram of the part L in FIG. 2A; FIG. 4B is another enlarged schematic diagram of the part L in FIG. 2A; and FIG. 4C is still another enlarged schematic diagram of the part L in FIG. 2A. As shown in FIG. 4A, for example, the second part of the light guide structure 5 is connected with the first support surface 4A by an insertion method; the first support surface 4A includes a first groove 71, a surface of the second part of the light guide structure 5 facing the first support surface 4A includes a first protrusion 72, the first protrusion 72 is located in the first groove 71, and a shape of the first protrusion 72 is complementary to a shape of the first groove 71. In this way, the light guide structure 5 and the first support part 61 are assembled without a need for locking and pasting operations, the structural connection is firm, the assembly is simple, and the cost is low.

For example, as shown in FIG. 4A, a direction from the light-emitting element 3 to the light guide plate 4 is a third direction D3, an area of a cross section surface of the first protrusion 72 perpendicular to the third direction gradually decreases along the third direction D3, so that a connection between the first protrusion 72 and the first groove 71 is more stable, and the first protrusion 72 is not easily disengaged from the first groove 71.

For example, in the embodiment shown in FIG. 4B, the first protrusion 72 has a bent part. For example, a cross section surface of the first protrusion 72 perpendicular to the third direction. D3 includes a bent part to make that the connection between the first protrusion 72 and the first groove 71 is more stable, and the first protrusion 72 is not easy to separate from the first groove 71.

For another example, as shown in FIG. 4C, the first support surface 4A includes a second protrusion 82, a surface of the second part of the light guide structure 5 facing the first support surface 4A includes a second groove 81, the second protrusion 82 is located in the second groove 81, and the shape of the second protrusion 82 is complementary to the shape of the second groove 81.

For example, as shown in FIG. 2A, the backlight assembly 10 further includes a frame region 2, at least partially surrounding the work region 1, the frame region 2 is non-luminous, that is, no light is emitted from the frame region 2. If the first support surface 4A is too narrow, that is, a width w2 of the first support surface 4A in the second direction D2 is too small, the problem that the light guide plate 4 may fall off from the first support part 61 during a low temperature storage test or due to assembly errors will be caused. For example, as shown in FIG. 4A, because the light guide structure 5 is light-transmitted and the width w2 of the light guide structure 5 protruding from the first support surface 4A in the second direction D2 is smaller than the width w1 of the light guide structure 5 connected with the light guide structure 5 in the second direction D2, for example w1−w2=1 mm-2 mm, in this way, a bonding width between the light guide structure 5 and the light guide plate 4 can be ensured, the light guide plate 4 can be prevented from falling off from the first support part 61, and the width of the frame region 2 can be reduced, at the same time, the incident amount of light in the edge region 1B can also be ensured, and the brightness of a peripheral image can be improved.

For example, the support structure 6 is opaque to light, in the case where the light guide structure 5 is opaque to light, the light guide structure 5 and the support structure 6 are made of a same material and are integrally formed, that is, constitute an integral structure.

For example, material of the support structure 6 is a metal material such as aluminum, copper, aluminum alloy, copper alloy, steel, etc., or an organic material such as plastic.

For example, in the embodiments shown in FIGS. 1 and 5A, each of the light guide structures 5 is connected with the first support surface 4A through at least one first groove 71, therefore, corresponding to each edge of the light guide plate 4 arranged with a plurality of light guide structures 5 spaced apart from each other, there are a plurality of first grooves 71 arranged along the edge of the light guide plate 4.

For example, as shown in FIG. 2A, the support structure 6 further includes a second support part 62, the second support part 62 is connected with the first support part 61 and is located in the frame region 2, a side surface of the second support part 62 facing the light guide plate 4 is intersected with the first support surface 4A, the side surface is in contact with at least one of the edges of the light guide plate 4 and the light guide structure 5, or, the side surface is spaced apart from at least one of the edges of the light guide plate 4 and the light guide structure 5. For example, the side surface of the second support part 62 facing the light guide plate 4 is perpendicular to the first support surface 4A; for example, the second support part 62 and the first support part 61 constitute a stepped structure.

For example, the first groove 71 is formed on the first support surface 4A, and the first groove 71 can be formed by an extrusion molding process; then, the light guide structure 5 connected with the first support surface 4A is formed on the first support surface 4A by using a glue-iron integrated injection molding process.

For another example, the first groove 71 is formed on the first support surface 4A, and the first groove 71 can be formed by an extrusion molding process; then, the light guide structure 5 is formed on the first support surface 4A through a glue dispensing and curing process.

For another example, the light guide structure 5 is formed by injection molding, the first support surface 4A and the bottom surface of the light guide structure 5 facing the first support surface 4A are both flat surfaces, and the bottom surface of the light guide structure 5 is attached to the first support surface 4A by means of double-sided tape.

In a case where the support structure 6 is opaque to light and the light guide structure 5 is light-transmitted, for example, a two-color injection molding process is used to form the light guide structure 5 and the support structure 6, and the light guide structure 5 and the support structure 6 are respectively a transparent structure and a non-transparent structure.

In the case that both the support structure 6 and the light guide structure 5 are made of an opaque material, the support structure 6 and the light guide structure 5 can be made of a same material through an integral molding process.

For example, as shown in FIG. 2A, the backlight assembly 10 includes a bottom plate, in which the light-emitting element 3 is located on the bottom plate, the first support part 61 is connected with the bottom plate 9, to realize a fixation of the support structure 6, so that a supporting function of the support structure 6 and the light guide structure 5 to the light guide plate 4 is realized.

Figure 7:
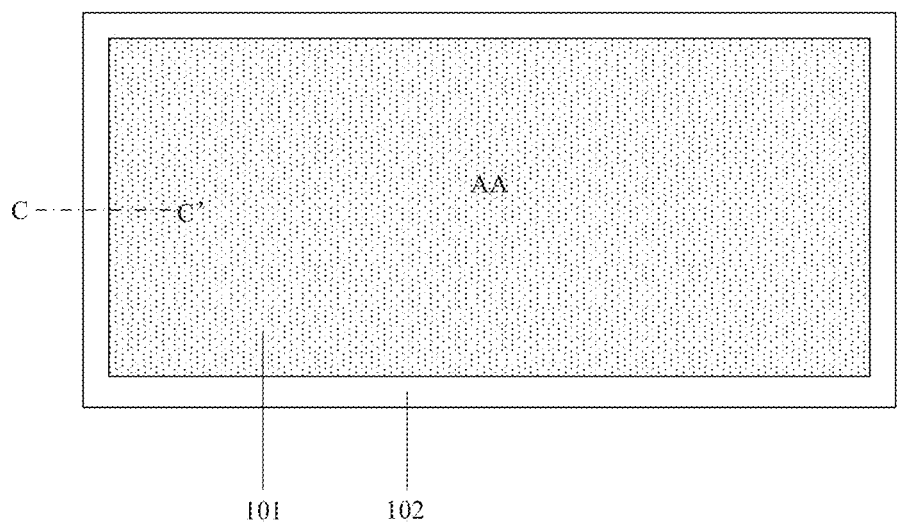
FIG. 7 is a planar schematic diagram of a display panel provided by an embodiment of the present disclosure.
Figure 8:
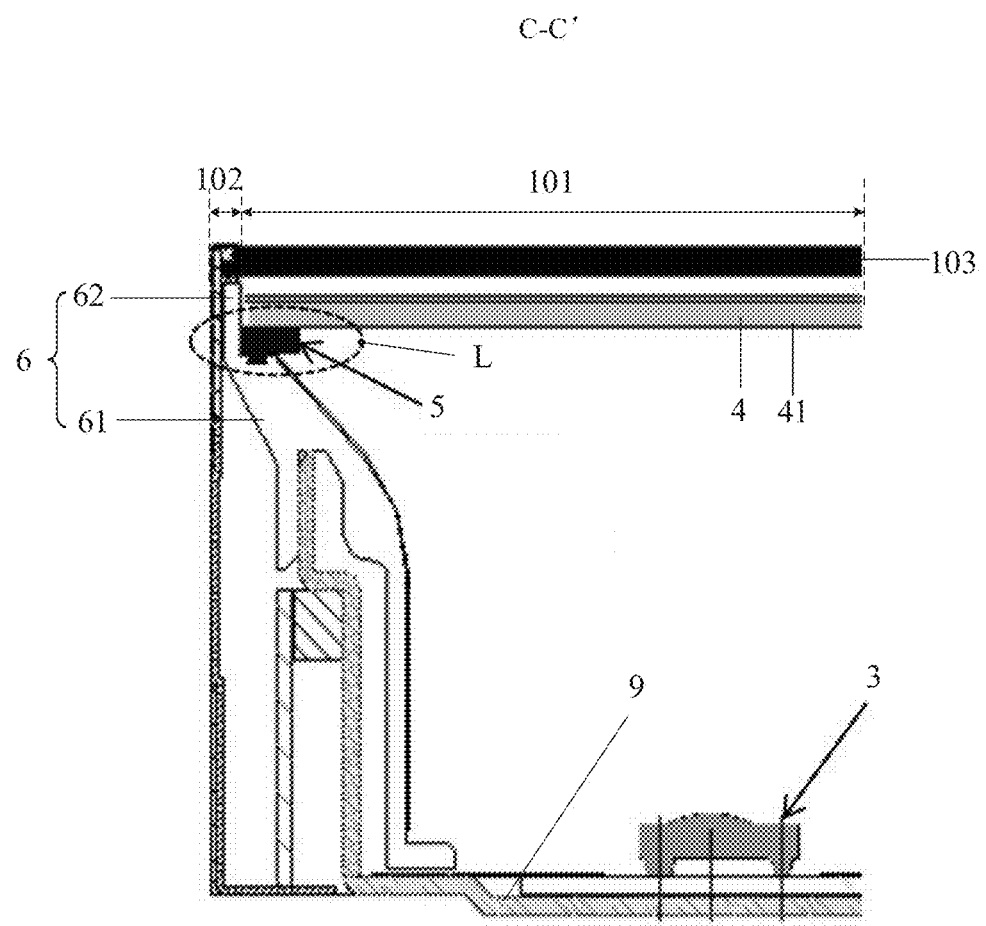
FIG. 8 is a cross-sectional schematic diagram taken along a line C-C in FIG. 7.

FIG. 7 is a planar schematic diagram of a display panel provided by an embodiment of the present disclosure, and FIG. 8 is a cross-sectional schematic diagram taken along the line C-C in FIG. 7. For example, as shown in FIGS. 7 to 8, at least one embodiment of the present disclosure further provides a display panel 100, the display panel 100 includes a display substrate 103 and any one of the backlight assemblies 10 provided by the embodiments of the present disclosure, the display substrate 103 is located at a side of the light guide plate 4 away from the light-emitting element 3. For example, the display substrate 103 is a display substrate that requires a backlight, such as an LCD substrate.

The display panel 100 includes a display surface (a surface away from the backlight assembly), the display surface includes a display region 101 and a non-display region 102 at least partially surrounding the display region, and the display region 101 is located in an orthographic projection of the work region 1 of the backlight assembly 10 on the display surface; the backlight assembly 10 is configured to allow the light emitted by the light-emitting element 3 to enter the display region, and allow light entering the edge region 1B of the backlight assembly 10 to enter the edge region 1B of the display region. The orthographic projection of the light guide structure 5 on the display surface is at least partially located in the edge region of the display region 101. The display panel 100 provided by the embodiment of the present disclosure can improve an uniformity of light in the edge region of the display region 102 and a brightness of the edge region of the display region 102, so that a problem that the edge region of the display region 102 is dark is solved, and the display quality is improved.

For example, all the orthographic projection of the light guide structure 5 on the display surface is located in the display region 101, so that the display panel 100 is provided with a narrow frame.

For example, the first support part 61 is configured to support the light guide plate 4, the second support part 62 is configured to support the display substrate 103, and an orthographic projection of the second support part 62 on the display surface of the display substrate 103 is located in the non-display region 102, to narrow the frame of the display panel 100.

Figure 9A:
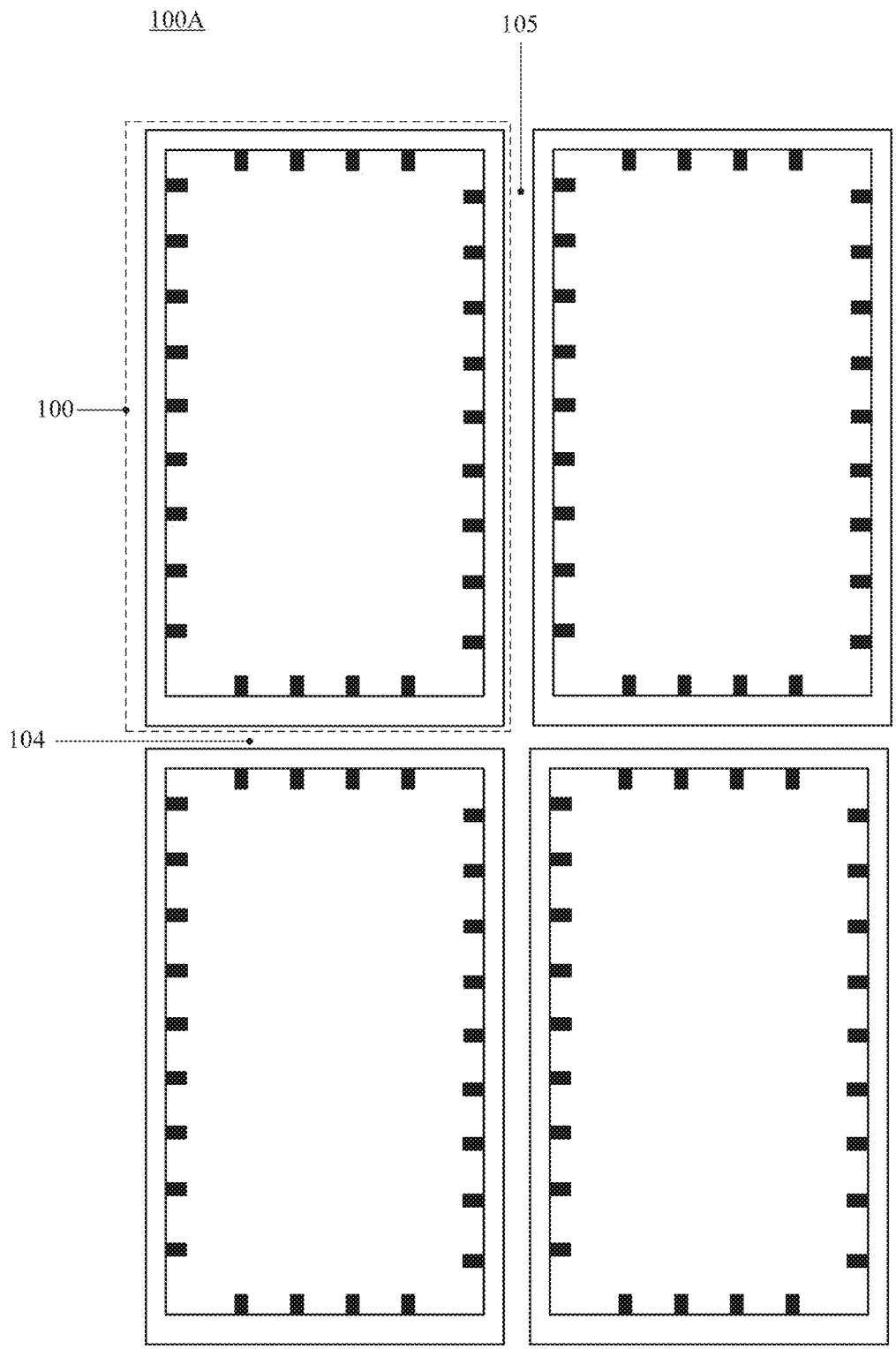
FIG. 9A is a planar schematic diagram of another display panel provided by an embodiment of the present disclosure.

FIG. 9A is a planar schematic diagram of another display panel provided by an embodiment of the present disclosure. The display panel 100A shown in FIG. 9A is a splicing display panel, the display panel 100A includes a plurality of display substrates 103, the plurality of display substrates 103 are spliced with each other, edges of adjacent display substrates 103 are opposite to each other, each of the seams 104/105 respectively exist between two adjacent display substrates 103. The backlight assembly 10 for providing backlight for each of the plurality of display substrates 103 is provided, the light guide structures 5 are located on at least one side of the corresponding seam 104 (or 105), for example, the light guide structures 5 are located on both sides of the corresponding seam 104 (or 105), to improve a display effect of an edge position of the display region 102 on both sides of one corresponding seam. As shown by a dotted frame in FIG. 9A, each of the display substrate 103 and its corresponding backlight assembly 10 constitute one of the above-mentioned display substrates 100. For example, FIG. 9A takes the splicing display panel 100A formed by splicing four display panels 100 (sub-display panels) as an example, the four sub-display panels 100 form a seam 104 and a seam 105, the seam 104 and the seam 105 are cross-shaped. However, the present disclosure does not limit a number of the sub-display panels 100 included in a splicing display panel 100A.

It should be noted that, the seams are non-display regions, and the light guide structures 5 are located at the edges of the display region 102 on both sides of each of the seams.

The brightness of the edge of the display region corresponding to the edge region near the seam of the splicing display panel 100A is relatively high, the phenomenon that the edge brightness of the display region on both sides of the seam is relatively dark can hardly be seen, which improves the display effect.

Figure 9B:
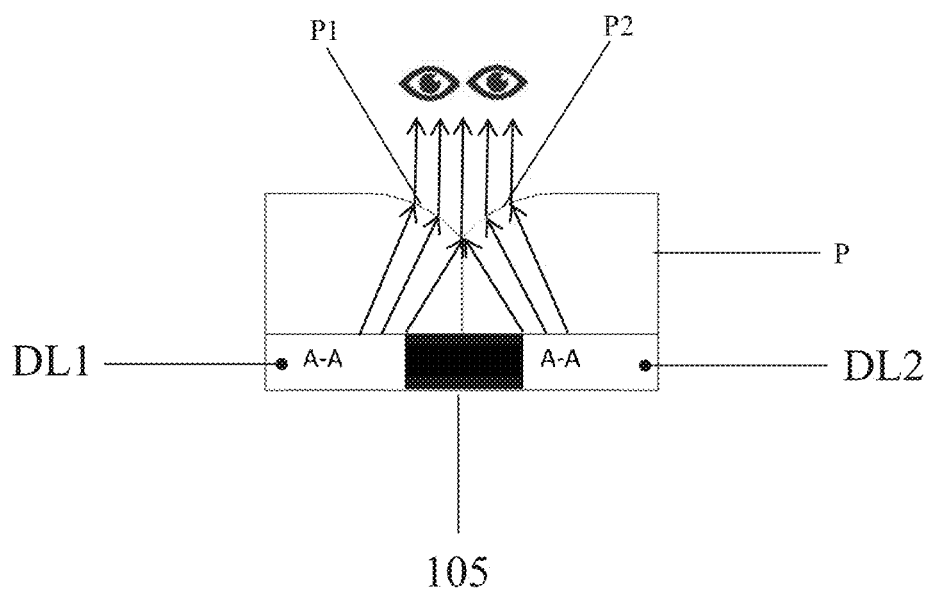
FIG. 9B is a planar schematic diagram of the part including a seam of still another splicing display panel provided by an embodiment of the present disclosure.

FIG. 9B is a planar schematic diagram of a part including a seam of still another splicing display panel provided by an embodiment of the present disclosure. As shown in FIG. 9B, for example, the splicing display panel provided by the embodiment of the present disclosure further includes a transparent optical layer P, the optical layer P covers the seam 105, and is located on the display side of the pixel layer DL of the two adjacent sub-display panels splicing the display panel. For example, the optical layer P covers the above-mentioned display region (AA), the non-display region and the seam 105 of the display panel where two adjacent sub-display panels are spliced. For example, an upper surface of the optical layer P away from the pixel layers DL1/DL2 includes a first arc-shaped part P1 and a second arc-shaped part P2, the first arc part P1 and the second arc part P2 are connected, an orthographic projection of a connecting position of the first arc-shaped part P1 and the second arc-shaped part P2 on the display surface is located within an orthographic projection of the seam 105 on the display surface, the orthographic projection of the seam 105 on the display surface is located within an orthographic projection of a whole structure constituted by the first arc-shaped part P1 and the second arc-shaped part P2 on the display, surface, and the first arc-shaped part P1 and the second arc-shaped part P2 are respectively convex toward a direction away from the pixel layers DL1/DL2; along a direction from a first end of the first arc-shaped part P1 that is in contact with the second arc-shaped part P2 to a second end of the first arc-shaped part P1 away from the second arc-shaped part P2, a distance from the first arc-shaped part P1 to the pixel layer DL1 corresponding to the first arc-shaped part P1 gradually increases; along a direction from a first end of the second arc-shaped part P2 that is in contact with the first arc-shaped part P1 to a second end of the second arc-shaped part P2 away from the first arc-shaped part P1, a distance from the second arc-shaped part P2 to the corresponding pixel layer DL2 gradually increases. Thus, the light from the display region is refracted by the first arc part P1 and the second arc part P2 and then exits more from the position of the seam 105.

For example, the display layer DL1/DL2 respectively includes a pixel circuit layer, a liquid crystal layer, and a color filter layer, etc.

For example, the material of the optical layer P is a transparent material, for example, glass, acrylic material such as polymethyl methacrylate (PMMA), and polycarbonate (PC). Of course, the embodiment of the present disclosure does not limit the material of the optical layer P, and may also be other light-transmitting materials.

Figure 9C:
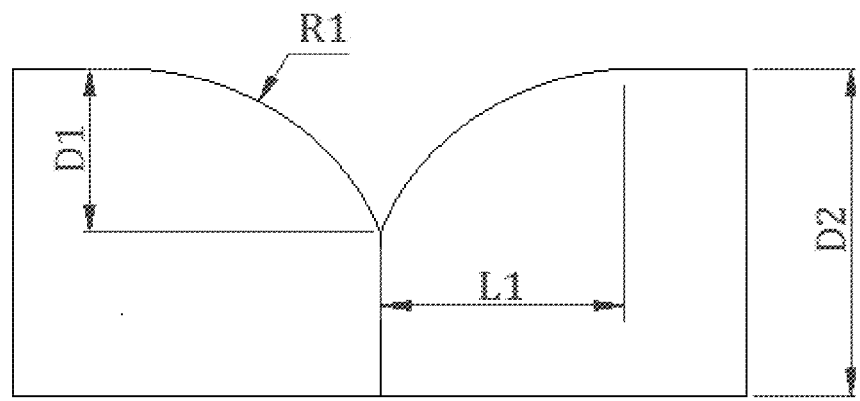
FIG. 9C is a schematic diagram of an optical layer P in FIG. 9B.

FIG. 9C is a schematic diagram of an optical layer P in FIG. 9B. As shown in FIG. 9C, a thickness D2 of the optical layer P in the direction perpendicular to the display surface ranges from 2 mm to 10 mm; a height D1 of the first arc part P1 in a direction perpendicular to the display surface is form 2 mm to 8 mm, an arc length L1 of the first arc part P1 ranges from 2 mm to 6 mm, an arc radius R1 ranges from 2 mm to 10 mm. The above-mentioned respective dimensions of the second arc-shaped part P2 are the same as those of the first arc shaped part P1. For example, the second arc part P2 and the first arc part P1 are substantially axisymmetric with respect to a symmetry axis arranged on the display surface.

Simulation tests were performed by using a first display panel including the optical layer P (D2 is set to 3 mm, D1=2 mm, L1=3 mm, R1=3 mm) and including the backlight assembly provided by the embodiment of the present disclosure, and a second display panel with the same other conditions as the first display panel but not including the optical layer P, compared with the second display panel, the brightness at the seam 105 of the first display panel and the brightness uniformity of the display region are higher.

In addition, a simulation test is performed on a third display panel including the optical layer P (D2 is set to 5 mm, D1=2 mm, L1=3 mm, R1=3 mm respectively) and not including the backlight assembly provided by the embodiment of the present disclosure and the first display panel, compared with the third display panel, the brightness uniformity at the seam 105 of the first display panel and the display region is higher. Therefore, in the display panel using the backlight assembly provided by the embodiment of the present disclosure, the thickness of the optical layer P can be reduced to achieve a relatively uniform display brightness, which is beneficial to realize the thinning of the display panel.

At least one embodiment of the present disclosure provides a display device, and the display device includes any one of the display substrates provided by the embodiments of the present disclosure. For example, the display device may be a display panel.

Figure 10:
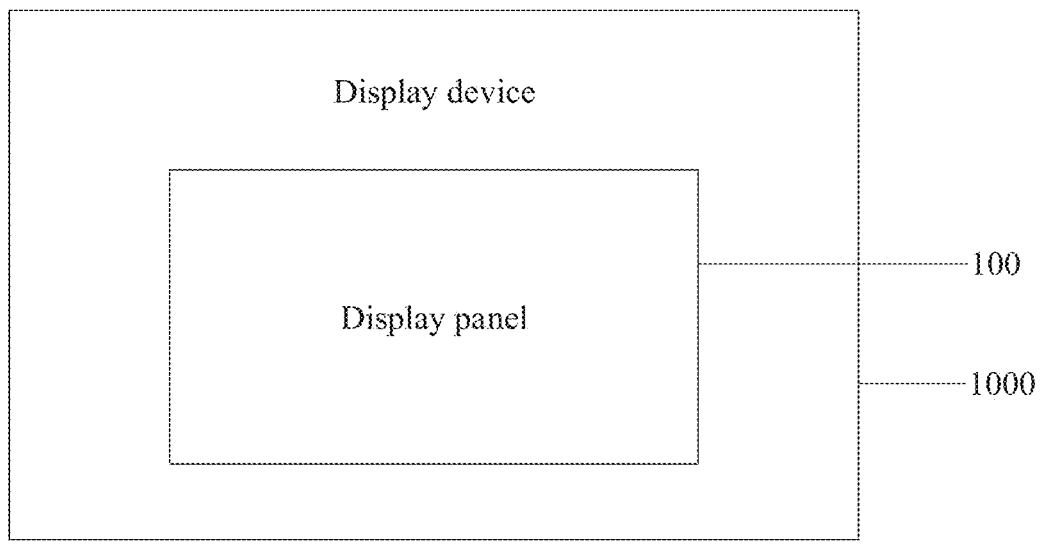
FIG. 10 is a schematic diagram of a display device provided by an embodiment of the present disclosure.

Exemplarily, FIG. 10 is a schematic diagram of a display device provided by, an embodiment of the present disclosure. As shown in FIG. 10, the display device 1000 provided by at least one embodiment of the present disclosure includes any one of the display panels 100 provided by the embodiments of the present disclosure.

For example, the display device 1000 is any display device that requires a backlight assembly, such as a liquid crystal display device. Of course, the display device 1000 is not limited to be a liquid crystal display device. Other structures of the display device 1000, such as a driving circuit, etc., can be designed with reference to conventional technologies in the art, which are not limited in the embodiments of the present disclosure.

For example, the display device is a liquid crystal display device, for example, includes the above-mentioned display panel and a backlight source, and may also include display devices with other structures, etc., such as mobile phones, tablet computers, displays, notebook computers, ATM machines and other products.

What are described above is related to only the illustrative embodiments of the present disclosure and not limitative to the protection scope of the present application. Therefore, the protection scope of the present application shall be defined by the accompanying claims.

What is claimed is:

1. A backlight assembly, comprising:
   a work region, comprising a center region and an edge region surrounding the center region;
   a light-emitting element, at least in the center region;
   a light guide plate, in the work region, and configured to conduct light emitted by the light-emitting element and allow the light to exit from the work region; and
   a light guide structure, at a side of the light guide plate close to the light-emitting element, and arranged along at least part of an edge of the light guide plate, wherein the light guide structure is configured to allow a part of the light emitted by the light-emitting element to enter the edge region;
   wherein the light guide structure is light-transmitted; and
   wherein the backlight assembly comprises a plurality of the light guide structures, the plurality of light guide structures are along the at least part of the edge of the light guide plate and spaced apart from each other, the plurality of light guide structures are configured that the light emitted by the light-emitting element passes through the plurality of light guide structures at positions of the plurality of light guide structures to reach the edge region and passes through the light guide plate at intervals between adjacent light guide structures of the plurality of light guide structures to reach the edge region.

2. The backlight assembly according to claim 1, wherein the light guide plate has a bottom surface facing the light-emitting element, and at least part of an orthographic projection of the light guide structure on a surface where the bottom surface of the light guide plate is located is within the bottom surface of the light guide plate.

3. The backlight assembly according to claim 1, wherein the light guide plate has a bottom surface facing the light-emitting element, and the light guide structure is in direct contact with the bottom surface of the light guide plate and protrudes from the bottom surface of the light guide plate.

4. The backlight assembly according to claim 1, wherein the light guide structure is light-transmitted; and
   the light guide structure is a continuous strip extending along the edge of the light guide plate, and the light guide structure is configured that the light emitted by the light-emitting element passes through the light guide structure and the light guide plate to reach the edge region.

5. The backlight assembly according to claim 1, wherein an extension direction of the edge of the light guide plate is a first direction; and in the first direction, a length of the interval between the adjacent light guide structures is greater than a length of each of the plurality of light guide structures.

6. The backlight assembly according to claim 5, wherein a ratio of the length of the interval to the length of each of the plurality of light guide structures is greater than or equal to 10.

7. The backlight assembly according to claim 6, wherein the length of the interval ranges from 30 mm to 50 mm; and
   the length of each of the light guide structures ranges from 1 mm to 2 mm.

8. The backlight assembly according to claim 5, wherein a direction perpendicular to the first direction and in the bottom surface of the light guide plate is a second direction, and a width of the light guide structure in the second direction ranges from 3 mm to 5 mm.

9. The backlight assembly according to claim 1, further comprising:
   a support structure, comprising a first support part, wherein the light guide plate has a bottom surface facing the light-emitting element, the first support part is located at a side of the light guide plate close to the light-emitting element and comprises a first support surface facing the light guide plate in a direction perpendicular to the bottom surface of the light guide plate, and the first support part is configured to support the light guide plate, and
   the light guide structure is between the first support surface and the bottom surface of the light guide plate, and is fixedly connected with the first support surface.

10. The backlight assembly according to claim 9, wherein the light guide structure comprises:
    a first part, wherein an orthographic projection of the first part on a plane where the first support surface is located is not overlapped with the first support surface; and
    a second part, wherein the second part is fixedly connected with the first support surface and an orthographic projection of the second part on the plane where the first support surface is located is overlapped with the first support surface.

11. The backlight assembly according to claim 9, further comprising:
    a frame region, at least partially surrounding the work region, wherein
    the support structure further comprises:

a second support part, connected with the first support part and in the frame region, wherein a side surface of the second support part facing the light guide plate is intersected with the first support surface, and the side surface of the second support part is in contact with or spaced apart from at least one selected from a group consisting of the edge of the light guide plate and the light guide structure.

12. A display panel, comprising a display substrate and the backlight assembly according to claim 1, wherein the display substrate is located at a side of the light guide plate away from the light-emitting element.

13. The display panel according to claim 12, wherein the display panel comprises a display surface, the display surface comprises a display region and a non-display region at least partially surrounding the display region, the display region is located in an orthographic projection of the work region of the backlight assembly on the display surface;
the backlight assembly is configured to allow the light emitted by the light-emitting element to enter the display region, and allow the light entering the edge region of the backlight assembly to enter an edge region at an edge of the display region of the display region; and
an orthographic projection of the light guide structure on the display surface is at least partially in the edge region of the display region.

14. The display panel according to claim 13, wherein in a case that the display panel comprises a support structure and the support structure comprises a first support part and a second support part, the first support part is configured to support the light guide plate,
the second support part is configured to support the display substrate, and an orthographic projection of the second support part on the display surface of the display substrate is in the non-display region.

15. The display panel according to claim 12, comprising:
a plurality of display substrates, wherein the plurality of display substrates are spliced with each other, edges of adjacent display substrates of the plurality of display substrates are opposite to each other, a seam is between the adjacent display substrates;
each of the plurality of display substrates is provided with the backlight assembly, and the light guide structure is located on at least one side of the seam.

16. A display device, comprising the display panel according to claim 12.

17. A backlight assembly, comprising:
a work region, comprising a center region and an edge region surrounding the center region;
a light-emitting element, at least in the center region;
a light guide plate, in the work region, and configured to conduct light emitted by the light-emitting element and allow the light to exit from the work region; and
a light guide structure, at a side of the light guide plate close to the light-emitting element, and arranged along at least part of an edge of the light guide plate, wherein the light guide structure is configured to allow a part of the light emitted by the light-emitting element to enter the edge region;
wherein the light guide structure is opaque to light; and
wherein the backlight assembly comprises a plurality of the light guide structures, the plurality of light guide structures are spaced apart from each other along the at least part of the edge of the light guide plate, and the plurality of light guide structures are configured that the light emitted by the light-emitting element passes through the light guide plate at an interval between adjacent light guide structures of the plurality of light guide structures to reach the edge region.

18. A backlight assembly, comprising:
a work region, comprising a center region and an edge region surrounding the center region;
a light-emitting element, at least in the center region;
a light guide plate, in the work region, and configured to conduct light emitted by the light-emitting element and allow the light to exit from the work region; and
a light guide structure, at a side of the light guide plate close to the light-emitting element, and arranged along at least part of an edge of the light guide plate, wherein the light guide structure is configured to allow a part of the light emitted by the light-emitting element to enter the edge region;
the backlight assembly further comprises:
a support structure, comprising a first support part, wherein the light guide plate has a bottom surface facing the light-emitting element, the first support part is located at a side of the light guide plate close to the light-emitting element and comprises a first support surface facing the light guide plate in a direction perpendicular to the bottom surface of the light guide plate, and the first support part is configured to support the light guide plate, and
the light guide structure is between the first support surface and the bottom surface of the light guide plate, and is fixedly connected with the first support surface;
the light guide structure comprises:
a first part, wherein an orthographic projection of the first part on a plane where the first support surface is located is not overlapped with the first support surface; and
a second part, wherein the second part is fixedly connected with the first support surface and an orthographic projection of the second part on the plane where the first support surface is located is overlapped with the first support surface;
the second part of the light guide structure is connected with the first support surface by an insertion method;
the first support surface comprises a first groove, a surface of the second part of the light guide structure facing the first support surface comprises a first protrusion, the first protrusion is in the first groove, and a shape of the first protrusion is complementary to a shape of the first groove, or, the first support surface comprises a second protrusion, a surface of the second part of the light guide structure facing the first support surface comprises a second groove, the second protrusion is in the second groove, and a shape of the second protrusion is complementary to a shape of the second groove.

19. The backlight assembly according to claim 18, wherein a direction from the light-emitting element to the light guide plate is a third direction; and
an area of a cross section of the first protrusion perpendicular to the third direction gradually decreases along the third direction, or the cross section of the first protrusion perpendicular to the third direction comprises a bent part.

\* \* \* \* \*